(12) United States Patent
Lynch et al.

(10) Patent No.: US 8,470,939 B2
(45) Date of Patent: Jun. 25, 2013

(54) PREPARATION OF POLYETHYLENE

(75) Inventors: Michael W. Lynch, West Chester, OH (US); Craig C. Meverden, Wexford, PA (US)

(73) Assignee: Equistar Chemicals, LP, Houston, TX (US)

( * ) Notice: Subject to any disclaimer, the term of this patent is extended or adjusted under 35 U.S.C. 154(b) by 1578 days.

(21) Appl. No.: 11/809,688

(22) Filed: Jun. 1, 2007

(65) Prior Publication Data
US 2008/0300370 A1   Dec. 4, 2008

(51) Int. Cl.
*C08F 2/00* (2006.01)
*C08F 4/44* (2006.01)
*C08F 110/02* (2006.01)

(52) U.S. Cl.
USPC ............... 526/75; 526/65; 526/127; 526/352

(58) Field of Classification Search
USPC .......................................... 526/124.5, 63, 72
See application file for complete search history.

(56) References Cited

U.S. PATENT DOCUMENTS

| | | | | |
|---|---|---|---|---|
| 4,190,614 A | * | 2/1980 | Ito et al. | 525/106 |
| 4,383,119 A | | 5/1983 | Pullukat et al. | 556/412 |
| 4,499,198 A | | 2/1985 | Pullukat et al. | 502/104 |
| 4,525,547 A | * | 6/1985 | Kato et al. | 526/68 |
| 4,530,914 A | | 7/1985 | Ewen et al. | 502/113 |
| 4,544,646 A | * | 10/1985 | Pullukat et al. | 502/109 |
| 4,551,439 A | * | 11/1985 | Harada et al. | 502/107 |
| 4,937,299 A | | 6/1990 | Ewen et al. | 526/119 |
| 4,968,653 A | | 11/1990 | Meverden et al. | 502/116 |
| 5,032,562 A | | 7/1991 | Lo et al. | 502/111 |
| 5,405,817 A | | 4/1995 | Kuo et al. | 502/113 |
| 5,534,472 A | | 7/1996 | Winslow et al. | 502/116 |
| 5,539,076 A | | 7/1996 | Nowlin et al. | 526/348.1 |
| 6,395,669 B1 | * | 5/2002 | Sartain et al. | 502/125 |

FOREIGN PATENT DOCUMENTS

EP    469858 A1  *  2/1992
RU  2176649 C1  *  12/2001

OTHER PUBLICATIONS

PCT/US2008/005229, Jul. 16, 2008, PCT International Search Report.
W. Yau et al., "New Approaches Using MW-Sensitive Detectors in GPC-TREF for Polyolefin Characterization," *Polymer* 42 (2001) 8947.
R. Shroff et al., "New Measures of Polydispersity from Rheological Data on Polymer Melts " *J. Applied Polymer Science* 57 (1995) 1605.

* cited by examiner

*Primary Examiner* — David W Wu
*Assistant Examiner* — Elizabeth Eng

(57) ABSTRACT

A process for preparing a polyethylene in a multi-stage process is described. The process comprises pre-treating a Ziegler catalyst in a first stage in the presence of a 1-olefin/ethylene mixture or a 1-olefin to produce a LLDPE or VLDPE, which have the characteristics of a polymer prepared with a single-site catalyst, e.g. high levels of short-chain branching that are uniformly distributed. The contents of the first stage are then transferred to a second stage where an ethylene or an ethylene/1-olefin mixture is polymerized in the presence of the pre-treated catalyst to form a polyethylene with good processability.

14 Claims, No Drawings

PREPARATION OF POLYETHYLENE

FIELD OF INVENTION

This invention relates to a process of preparing a polyethylene with a pre-treated catalyst. The process comprises a first stage of pre-treating a catalyst. In the second stage, ethylene or an ethylene/1-olefin mixture is polymerized in the presence of the pre-treated catalyst. The process is surprisingly useful for the preparation of polyolefins with enhanced short-chain branching and good processability.

BACKGROUND OF THE INVENTION

One method of classifying polyethylenes is by density. A high-density polyethylene (HDPE) has a density ranging from about 0.941 g/cm$^3$ to about 0.970 g/cm$^3$, a medium-density polyethylene (MDPE) from about 0.926 g/cm$^3$ to about 0.940 g/cm$^3$; and a low-density polyethylene (LDPE) from about 0.910 g/cm$^3$ to about 0.925 g/cm$^3$. Subcategories of LDPE include linear low density polyethylene (LLDPE) and very low density polyethylene (VLDPE). LLDPE has a density ranging from about 0.916 g/cm$^3$ to about 0.930 g/cm$^3$ and VLDPE has a density ranging from about 0.890 g/cm$^3$ to about 0.915 g/cm$^3$.

LLDPE and VLDPE are prepared by copolymerizing ethylene and 1-olefins. The incorporation of 1-olefins results in short chain branching (SCB) of 10 carbon atoms or less. A range of properties in polyethylenes can be obtained by controlling the amount of SCB and the short-chain branching distribution (SCBD). SCBD is a measure of the distribution of short chain branches across the width of the copolymer molecular weight distribution (MWD). A more uniform or homogenous distribution of SCB can lead to improved mechanical properties.

Multi-site catalysts, e.g. Ziegler, and single-site catalysts, e.g. metallocene, are commonly used to prepare LLDPE and VLDPE. While single-site catalysts, when compared to Ziegler catalysts, are known to produce polyethylenes with greater monomer incorporation, more uniform SCBD and a narrower MWD, the polyethylenes have been known to suffer from poor processability. Polyethylenes prepared with Ziegler catalysts exhibit good processability. However, the lower amount and less uniform SCB can adversely affect physical properties, such as dart-drop strength in film applications.

Methods of preparing polyethylenes that take advantage of the benefits of both single- and multi-site catalysts are known. One method is to blend two or more polyethylenes having different properties before or during processing. For example, a polyethylene prepared with a single-site catalyst and a polyethylene prepared with a Ziegler catalyst can be melt blended to produce a polyethylene blend. One difficulty with melt blending is that it can be difficult to produce polyethylene blends that are homogenous.

Another approach is to use two catalysts in one or more reactors to form a bi- or multimodal polyolefin. For example two single-site catalysts or a single-site and a Ziegler catalyst can be used, see e.g., U.S. Pat. Nos. 4,937,299, 4,530,914, 5,032,562 and 5,539,076. Processes using two catalysts are more complicated and single-site catalysts can be more expensive than Ziegler catalysts.

While some processes employ two Ziegler catalysts in a multi-reactor polymerization, the resulting polyethylene can suffer from the same problems associated with Ziegler catalysts, e.g. low levels of SCB, as discussed above.

In sum, new processes are needed. Particularly valuable processes would use one catalyst to produce a polyethylene that has the attributes of a polyethylene prepared with a single-site and Ziegler catalyst.

SUMMARY OF THE INVENTION

The invention is a process that involves pre-treating a Ziegler catalyst in a first reaction stage in the presence of either a 1-olefin/ethylene mixture or a 1-olefin(s) for a period of time ranging from about 15 seconds to about 15 minutes. The pre-treated catalyst and the polymer produced are transferred to the second stage. Surprisingly we discovered that when the Ziegler catalyst is pre-treated for a short period of time, the polymer produced with the pre-treated catalyst possesses characteristics normally associated with single-site catalysts. In the second stage, polyethylene is prepared in the presence of the pretreated catalyst. The polyethylene produced exhibits the processability associated with Ziegler catalysts and the benefits associated with single-site catalysts.

DETAILED DESCRIPTION OF THE INVENTION

In the first stage, a Ziegler catalyst is pre-treated in the presence of a 1-olefin/ethylene mixture or a 1-olefin for a period of time ranging from about 15 seconds to about 15 minutes, more preferably from about 30 seconds to about 10 minutes, and most preferably from about 60 seconds to about 7 minutes.

A suitable temperature for the first stage is within the range of about 55° C. to about 120° C., more preferably from about 60° C. to about 110° C., and most preferably from about 65° C. to about 95° C.

A suitable molar ratio of 1-olefin/ethylene for pre-treating the catalyst is preferably within the range of about 0.65 to about 5.0, more preferably from about 0.75 to about 4.5, and most preferably from about 0.80 to about 4.0.

The polymer produced in the first stage will generally have a density within the range of about 0.88 g/cm$^3$ to about 0.92 g/cm$^3$, more preferably from about 0.89 g/cm$^3$ to about 0.91 g/cm$^3$. These densities correspond to a LLDPE or a VLDPE. The density is measured in accordance with ASTM D 1505.

A suitable amount of polymer produced in the first stage is about 3 wt. % or less of the total amount of polyethylene produced in the first and second stages. It will be understood by those with skill in the art, that multiple reactors can be included in the first stage.

The 1-olefin used in the first and second reaction stage is preferably selected from the group consisting of propylene, 1-butene, 1-pentene, 1-hexene, 1-octene, 4-methyl-1-pentene, the like, and mixtures thereof.

The catalyst system comprises an alkyl magnesium silylamide, a transition metal and a co-catalyst. The alkyl magnesium silylamide compounds used in this invention, their structure, and their preparation are described in U.S. Pat. Nos. 4,383,119 and 4,499,198, the teachings of which are incorporated herein by reference.

The transition metal compounds are preferably a halide, oxyhalide, alkoxyhalide, or an alkoxide of Ti, Zr, V, or Cr. Suitable transition metal compounds include TiCl$_4$, Ti(OR$^2$)Cl$_{4-x}$, VOCl$_3$, VCl$_4$, Zr(OR$^2$)$_x$Cl$_{4-x}$ and mixtures thereof, where R is a C$_1$ to C$_{10}$ alkyl group or a C$_6$ to C$_{14}$ aryl group. The R groups may be the same or different and x is from 0 to 4. More preferably, the transition metal compound is TiCl$_4$ or ZrCl$_4$, and most preferably, the transition metal compound is TiCl$_4$.

The co-catalyst is added prior to polymerization or simultaneously with the introduction of the catalyst to the reaction in the first stage. Suitably co-catalysts include organoaluminum, e.g. trialkyl aluminum, alumoxanes and derivatives thereof. More preferably, the co-catalyst is an alkyl alumoxanes such as methyl alumoxane (MAO), PMAO, ethyl alumoxane, or diisobutyl alumoxane; most preferably the co-catalyst is diisobutyl alumoxane (DIBAL-O). The ratio of aluminum to transition metal is preferably within the range of about 0-500 to 1, more preferably from about 1-50 to 1.

The catalyst can be supported or unsupported depending on the method of polymerization. The support can be prepared from inorganic oxides, inorganic chlorides and organic polymer resins or mixtures thereof. Preferred inorganic oxides include oxides of Group 2, 3, 4, 5, 13, or 14 elements. Preferred inorganic chlorides include chlorides of the Group 2 elements. Preferred organic polymer resins include polystyrene, styrene-divinylbenzene copolymers, and polybenzimidizole. Particularly preferred supports include silica, alumina, silica-alumina, magnesia, titania, zirconia, magnesium chloride and mixtures thereof.

The support can be pre-treated prior to the immobilization of the catalyst. The support may be calcined and/or modified with a chemical additive. If the support is pre-treated by calcination, the calcination temperature is preferably greater than 150° C. The chemical additives used to pre-treat the support include organoaluminum, alumoxane, organoborane, organomagnesium, organosilane, organozinc compounds and mixtures thereof.

An essential feature of the invention is the production of polyethylenes in the first stage with significant levels of SCB. The term "short chain branching", refers to branches that are 10 carbon atoms or less. The polymer produced in the first stage has SCB within the range of about 30 to about 60 short-chain branches (SCB)/1000 carbon atoms, more preferably from about 35 to about 55, and most preferably from about 40 to about 50.

Surprisingly we were able to produce a polymer with a narrow MWD and high levels of SCB uniformly distributed in the first stage as demonstrated by the copolymerization of ethylene and 1-butene in accordance with the process of this invention.

The amount of SCB is measured using a temperature rising elution fractionation (TREF) technique, as described by Yau and Gillespie in their article entitled "New Approaches Using MW-Sensitive Detectors in GPC-TREF for Polyolefin Characterization", *Polymer* vol. 42, pp. 8947-8958 (2001). In the procedure, the polyethylene is dissolved in a solvent and injected onto a packed column. As the column cools, the polyethylene fractions precipitate beginning with the fraction with the lowest amount of SCB, which precipitates on the innermost layer on the packing particles. When the column is heated, the most highly branched fractions elute first. By detecting the fractions a polyethylene concentration over the elution temperature range is plotted to provide a SCB distribution or TREF curve. The breadth of the TREF curve provides an indication of the SCB distribution. At the same polymer density, a narrower TREF curve indicates a narrower SCB distribution, i.e., the polymer chains have similar amounts of short-chain branching.

The heats of fusion (Hf) were determined using Differential Scanning Calorimetry (DSC). The heat of fusion is based on the principle that different morphologies, e.g. amorphous or crystalline, have different heat capacities. Elevated heats of capacity tend to indicate a higher level of crystallinity in the polymer, and less SCB.

The melt index ($MI_2$) of the polymer made in the first stage is within the range from about 0.01 g/10 min. to about 5.0 g/10 min., more preferably from about 0.1 g/10 min. to about 4.0 g/10 min., and most preferably from about 0.3 g/10 min. to about 3.0 g/10 min. The melt indices $MI_2$ is determined in accordance with ASTM D 1238-01, condition 190/2.16.

Suitable ER of the polymer made in the first stage is within the range of about 0.5 to about 4, more preferably from about 1.0 to about 3.5, and most preferably from about 1.5 to about 3.0.

ER is a measure of the elasticity or the polydispersity of the polymer which is derived from Theological data on the polymer melts, see the article Shroff, et al., entitled "New Measures of Polydispersity from Rheological Data on Polymer Melts," *J. Applied Polymer Science*, Vol. 57, pp. 1605-1626 (1995) and U.S. Pat. No. 5,534,472.

ER values are calculated from rheological data generated by measuring dynamic rheology in the frequency sweep mode, as described in ASTM 4440-95a. A Rheometrics ARES rheometer was operated at 150° C., in the parallel plate mode in a nitrogen environment. The gap in the parallel plate geometry was about 1.2 mm to about 1.4 mm and the strain amplitude was about 10% to 20%. The range of frequencies was about 0.0251 rad/sec. to about 398.1 rad/sec.

The polydispersity (Mw/Mn) of the polymer produced in the first stage is less than about 4.5, more preferably less than about 4 and most preferably less than about 3.

The pre-treatment of the catalyst in the first stage can be performed in a single reactor, multiple reactors, a loop reactor and the like. For example, the first stage could consist of two or more loops reactors. The contents of the loops could then be transferred to another reactor used in the second stage. Alternatively the contents of the first reaction stage can be collected and stored. The stored pre-treated catalyst and polymer can be used later.

The first stage can be performed in slurry, gas phase, or in super-critical phase. For a slurry process, the reaction medium employed should be liquid that is relatively inert under the conditions of polymerization. It is desirable to use a solvent having a boiling point in the range of about 50° C. to about 150° C. Solvents of lower boiling point create high pressure in the reaction, while high boiling solvents are difficult to remove.

Suitable solvents include a $C_3$ to $C_{10}$ alkane and aromatic hydrocarbons, such as toluene, ethylbenzene, or xylene, and mixtures thereof. Examples of suitable solvents include propane, isobutane, pentane, hexane, isohexane, heptane, and mixtures thereof such as Isopar G solvent (product of ExxonMobil Company).

For a gas-phase polymerization the pressure is typically within the range from about 250 psi to about 800 psi, more preferably from about 300 psi to about 750 psi, and most preferably from about 350 psi to about 700 psi. The temperature is within the range of about 60° C. to about 120° C., more preferably from about 70° C. to about 100° C., and most preferably from about 75° C. to about 95° C.

Hydrogen may be included in the first stage to regulate the molecular weight. Suitable amount of hydrogen ranges from about 0.5% to about 10.0% of the total reactor pressure.

Additives known to those with skill in the art (e.g. antioxidants, lubricants, stabilizers) can be added at anytime during the first and second stage in an amount designed to provide their intended effect in the resulting polyethylene. The total amount of such additives will generally range from about 0.01 wt. % to about 5.0 wt. % based on the total weight of the polymer composition.

The contents of the first stage can be transferred to the second stage in continuous or batch mode. The reactors can be continuously swept with an inert gas or an inert liquid. One advantage of this reaction is that the unreacted monomer does not need to be separated and recycled. Instead the monomer can be transferred to the second stage, where additional ethylene and/or 1-olefin are added to produce the desired polyethylene resin.

In the second reaction stage, the reaction conditions are a function of the final polyethylene resin desired. HDPE, MDPE, or LLDPE can be prepared in the second stage. Preferably, the polymer prepared in the second stage has a weight average molecular weight Mw within the range of about 50,000 to about 2,000,000. To prepare a HDPE in the second stage, the ethylene/1-olefin molar ratio is preferably within the range from about 1/0.001 to about 1/0.08 and, more preferably, from about 1/0.001 to about 1/0.05. For MDPE the ethylene/1-olefin molar ratio is preferably within the range from about 1/0.05 to about 1/0.15, more preferably from about 1/0.05 to about 1/0.1. For LLDPE the ethylene/1-olefin molar ratio is preferably within the range from about 1/0.15 to about 1/0.5, more preferably from about 1/0.15 to about 1/0.25.

If additional catalyst and co-catalyst are used in the second stage, they will preferably be the same catalyst and co-catalyst used in the first stage. The additional catalyst and co-catalyst in the second reactor can be pre-treated catalyst or catalyst that has not be pre-treated.

If an additional catalyst is used in the second stage that is not pretreated, the catalyst can be supported or unsupported on a support that can be calcined or pre-treated, as discussed above.

Suitable 1-olefins for the second stage are the same as those in the first stage discussed above.

The second stage can be any type of process, e.g. slurry, gas phase, with or without the use of hydrogen; hydrogen can be added in the second stage in the amounts that were discussed above.

The temperature and the amount of time in the second stage can vary widely depending on the desired characteristics of the polyethylene and what is generally known in the art. Generally the temperature ranges from about 50° C. to about 300° C. The amount of time is from about 2 hours to 12 hours.

One of the main uses of polyethylenes (HDPE, MDPE or LLDPE) made by the invention is in film applications, such as grocery sacks, institutional and consumer can liners, merchandise bags, shipping sacks, food packaging films, multiwall bag liners, produce bags, deli wrap, stretch wrap and shrink wrap. These films are produced by a blown film or cast process. The films of this invention can also be used in multilayer films with tie or adhesive layers and a multilayer film can be machine oriented uniaxially or biaxially. HDPE can also be used in pipe applications, molded articles, packaging or containers by injection and blow-molding.

The following examples are provided to illustrate the invention more fully; however, those skilled in the art will recognize variations that are within the spirit of the invention and scope of the claims.

EXAMPLE 1

Synthesis of Butyl Magnesium Bis(trimethylsilyl)amide (BMSA)

A Fischer-Porter test tube size aerosol compatibility vessel is fitted with a tee and valves to maintain a nitrogen atmosphere. A heptane solution of butyl ethyl magnesium (25 mL, 16 mMoles) and hexamethyl disilazane (3.3 mL) are injected by syringe into the tube. Gas is evolved when the two reactants are contacted. After 1 hour and 40 minutes at room temperature, the contents of the tube are transferred to a flask for solvent evaporation without exposing the contents to air.

After about four hours at room temperature, with a $N_2$ flow, crystals began to appear in the viscous residue. The following day, the residue appears to be completely solidified. A vacuum is applied for two hours to remove any volatiles.

The flask is immersed in a water bath, and the bath is slowly heated. The solid melts between 50° C. and 60° C. to form a viscous liquid. At 80° C. the clear liquid is vacuumed for an additional period, and then cooled to room temperature. After about five minutes, the product became cloudy and viscous to form the BMSA.

EXAMPLE 2

Preparation of the Titanium/Alkyl Magnesium Silyl Amide Catalyst

A heptane solution of ethylaluminum dichloride (13.0 mL, 20 mM) is added to a flask. A hexane solution of butyl magnesium bis(trimethylsilyl)amide (8.9 mL, 5.0 mM), is slowly added to heptane solution in the flask. A finely divided white precipitate forms. When a heptane solution of $TiCl_4$ (1 mL, 1 mM $TiCl_4$) is added, a yellow-tan suspension is formed. After stirring for ½ hr. the catalyst slurry changed color from tan to brown.

EXAMPLES 3-8

Pre-Treatment of the Catalyst, According to the Invention

A bench scale reactor (1-L) with a temperature control system capable of controlling temperature to within 0.5° C. of the set point is used for examples 3-21. The reactor is purged with $N_2$ and brought to a temperature of 90° C. The reactor is charged with $H_2$ (150 psi), followed by the addition of isobutane and 1-butene to the reactor. The total volume of isobutane and 1-butene is 500 mL. If 130 mL of 1-butene is used, then the balance of isobutane is 370 mL. The amount of 1-butene added to the reactor for examples 3-4 is 130 mL, for examples 5-6 it is 100 mL and for examples 7-8 it is 75 mL. The diisobutyl alumoxane (DIBAL-O) cocatalyst (0.31 mL), followed by the catalyst (0.031 g) are flushed into the reactor with a small amount of isobutane. The run-time of 5 minutes begins when the catalyst is added to the reactor.

The reactor is run in semi-batch mode, wherein additional ethylene is added to maintain a constant pressure of 400 psig. The reactions are terminated by shutting off the ethylene supply and rapidly venting the reactor. The polymers are air-dried in a hood overnight before measuring the polyethylene properties.

The results indicate that the pre-treated catalyst efficiently incorporates the co-monomer into the polymer chain. A density that is low suggests more SCB in the polymer. The pre-treatment of the catalyst produced very low density polyethylenes of desirably high molecular weight.

EXAMPLES 9-14

Pre-Treatment of the Catalyst According to the Invention

The pre-treated catalyst of examples 9-14 is prepared according to the same procedure employed for examples 3-8, except the run-time is 10 minutes. The amount of 1-butene added to the reactor prior to the pre-treatment is as follows: 130 mL for examples 9-10, 100 mL for examples 11-12, and 75 mL for examples 13-14.

The results, e.g. higher densities, indicate less efficient incorporation of the co-monomer than for the above results.

COMPARATIVE EXAMPLES 15-20

The pre-treated catalyst of examples 15-20 is prepared according to the same procedure employed for Examples 3-8, except the run-time is 60 minutes. The amount of 1-butene added to the reactor is as follows: 170 mL for examples 15-16, 150 mL for examples 17-18, and 130 mL for examples 19-20. The results are listed in Table 1.

COMPARATIVE EXAMPLE 21

The pre-treatment of the catalyst in example 21 is prepared according to the same procedure in examples 15-20 (run-time of 60 minutes), except Triethyl Aluminum (TEAL) is used rather than DIBAL-O. The amount of 1-butene added to the reactor is 130 mL.

This higher density of the polymer produced indicates that the TEAL co-catalyst is less efficient at incorporating the SCB. The results are listed in Table 1.

TABLE 1

Results for the pre-treatment of the catalyst

| Ex. | Time (min.) | Butene (ml) | DSC (Hf*) | Density (g/cm³) | MI (g/10 min.) | ER** |
|---|---|---|---|---|---|---|
| 3-4 | 5 | 130 | 67.15 | 0.904 | 3.7 | 2.01 |
| 5-6 | 5 | 100 | 92.55 | 0.914 | 1.9 | n/m |
| 7-8 | 5 | 75 | 112.4 | 0.921 | 1.2 | n/m |
| 9-10 | 10 | 130 | 85.6 | 0.910 | 3.7 | 1.63 |
| 11-12 | 10 | 100 | 98.5 | 0.915 | 3.4 | 1.01 |
| 13-14 | 10 | 75 | 120..3 | 0.923 | 1.7 | n/m |
| C15-16 | 60 | 170 | 67.85 | 0.902 | 10.0 | 0.84 |
| C17-18 | 60 | 150 | 66.3 | 0.898 | 7.6 | 0.87 |
| C19-20 | 60 | 130 | 94.7 | 0.910 | 7.3 | 1.16 |
| C21 | 60 | 130 | 110.9 | 0.920 | 2.1 | n/m | n/m = no measurement taken,
C = comparative.
*Hf: heat fusion, indication of the crystallinity of the polyethylene; a high value of Hf means a high degree of crystallinity.
**ER: melt elasticity, a measure of polydispersity of the polymer. See an article by R. Shroff, et al. entitled "New Measures of Polydispersity from Rheological Data on Polymer Melts", J. Applied Polymer Science, Vol. 57, pp. 1605-1626 (1995).

We claim:

1. A process of preparing a polyethylene, the process comprising:
   (a) in a first stage, pre-treating a Ziegler catalyst by contacting the Ziegler catalyst and co-catalyst with a 1-olefin or a 1-olefin/ethylene mixture having a molar ratio of 1-olefin/ethylene within the range of about 0.8 to about 4.0, at a temperature within the range of about 55° C. to about 120° C., and for a time of from about 15 seconds to about 15 minutes; and
   (b) in a second stage, polymerizing ethylene or an ethylene/1-olefin mixture having a molar ratio of ethylene/1-olefin within the range of about 1/0.001 to about 1/0.2, in the presence of the pre-treated catalyst,
   wherein the Ziegler catalyst comprises a transition metal and an alkyl magnesium silyl amide complex, wherein the transition metal is selected from the group consisting of Ti, Zr, V, Cr and mixtures thereof, and an alkyl aluminum co-catalyst, and wherein a polymer produced in the first stage has a density within the range of about 0.88 g/cm³ to about 0.92 g/cm³, a molecular weight distribution less than or equal to about 4.0, and an ER within the range of about 1.0 to about 3.0, and wherein the first and second stages are gas-phase or super-critical phase processes.

2. The process of claim 1, wherein the catalyst is pretreated for about 30 seconds to about 8 minutes.

3. The process of claim 1, wherein the catalyst is pretreated for about 45 seconds to about 5 minutes.

4. The process of claim 1, wherein the temperature in the first stage is within the range of about 60° C. to about 95° C.

5. The process of claim 1, wherein the amount of the polymer produced in the first stage is less than about 3 wt. % of the total amount of the polyethylene, produced in the first and second stages.

6. The process of claim 1, wherein the polymer produced in the first stage has a density within the range of about 0.89 g/cm³ to about 0.91 g/cm³.

7. The process of claim 1, wherein the polymer produced in the first stage has an amount of short chain branching (SCB) within the range of about 30 to about 60 SCB/1000 carbon atoms.

8. The process of claim 7, wherein the SCB is concentrated in the high molecular weight region of the polyethylene.

9. The process of claim 1, wherein the co-catalyst is selected from the group consisting of alkyl alumoxanes, alkylaluminum compounds, aluminoboronates, organoboranes, ionic borates, ionic aluminates, and mixtures thereof.

10. The process of claim 1, wherein the co-catalyst is an alumoxane or a derivative thereof.

11. The process of claim 1, wherein the co-catalyst is diisobutyl alumoxane.

12. The process of claim 1, wherein the polyethylene produced from the first and second stages has a density of about 0.910 g/cm³ to about 0.968 g/cm³.

13. The process of claim 1, wherein the 1-olefin in the first stage and second stage is independently selected from the group consisting of propylene, 1-butene, 1-pentene, 1-hexane, 1-octene, 4-methyl-1-pentene, and mixtures thereof.

14. The process of claim 1, wherein the molar ratio of ethylene/1-olefin in the second stage is within the range of about 1/0.07 to about 1/0.15.

* * * * *